United States Patent [19]

Shimahara et al.

[11] 4,072,926
[45] Feb. 7, 1978

[54] TIRE PRESSURE WARNING APPARATUS

[75] Inventors: Yoichi Shimahara; Takashi Shimada, both of Takatsuki, Japan

[73] Assignee: The Toyo Rubber Industry Co., Ltd., Osaka, Japan

[21] Appl. No.: 616,360

[22] Filed: Sept. 24, 1975

Related U.S. Application Data

[63] Continuation of Ser. No. 426,737, Dec. 20, 1973, abandoned.

[30] Foreign Application Priority Data

Dec. 30, 1972 Japan .................................. 48-2836
Apr. 20, 1973 Japan ................................ 48-45455

[51] Int. Cl.² ............................................ B60C 23/02
[52] U.S. Cl. .................................... 340/58; 73/146.5; 200/61.22
[58] Field of Search ....................... 340/58, 60, 258 C; 324/61 QL, 167; 200/61.22, 61.25; 73/146.2, 146.5

[56] References Cited

U.S. PATENT DOCUMENTS

| | | | |
|---|---|---|---|
| 3,155,938 | 11/1964 | Meyers | 340/58 |
| 3,161,387 | 12/1964 | Jutier | 340/258 C |
| 3,602,884 | 8/1971 | Brumbelow | 340/58 |
| 3,614,732 | 10/1971 | Lejeune | 340/58 |
| 3,662,335 | 5/1972 | Fritze | 340/58 |
| 3,805,185 | 4/1974 | Kishi et al. | 340/258 C |
| 3,922,639 | 11/1975 | Shimahara et al. | 340/52 F |
| 3,990,041 | 11/1976 | Blanchier | 340/58 |
| 4,006,449 | 2/1977 | Sumi | 340/58 |

FOREIGN PATENT DOCUMENTS 1,383,360   2/1975   United Kingdom ................ 73/146.5

Primary Examiner—Donald J. Yusko
Assistant Examiner—Joseph E. Nowicki
Attorney, Agent, or Firm—Sughrue, Rothwell, Mion, Zinn and Macpeak

[57] ABSTRACT

An apparatus which is responsive to fluid pressure for detecting and indicating visually and accoustically the variation of pressure conditions such as the underinflation of vehicle tires. The apparatus comprises pressure sensors, annular conductive members, at least a pair of confronting heads, response means and indicating means. When the tire air pressure is normal, since the impedance value of the conductive members does not vary, the indicating device is not actuated. However, if the air pressure within even one of the tires becomes abnormal, the apparatus performs as designed and a signal emitted by the indicating device informs the driver of the abnormality.

2 Claims, 7 Drawing Figures

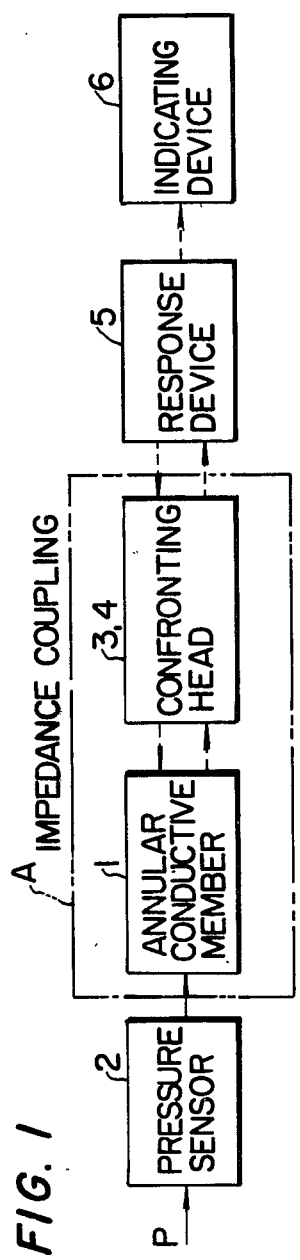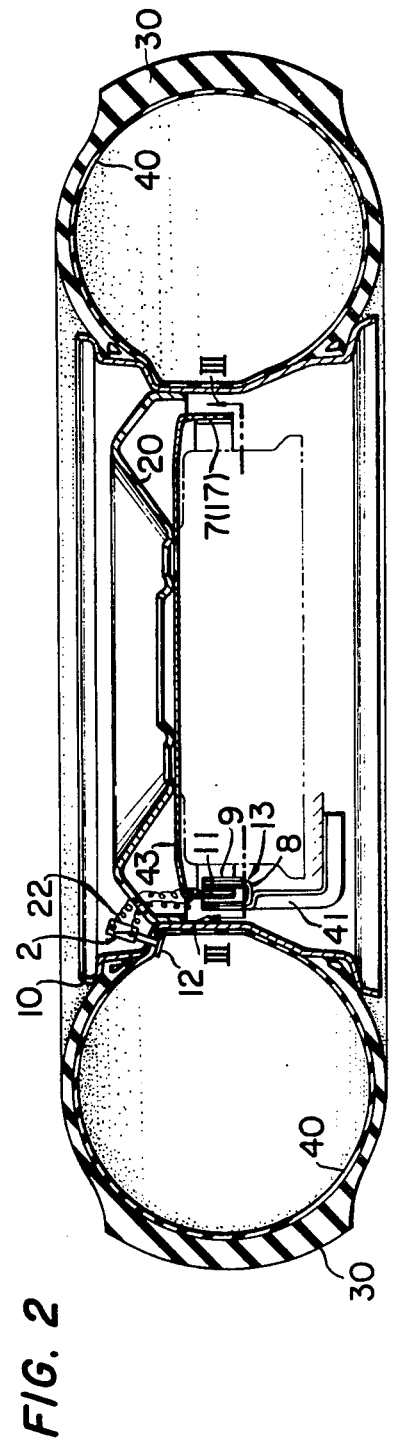

TIRE PRESSURE WARNING APPARATUS

This is a continuation, of application Ser. No. 426,737, filed Dec. 20, 1973, abandoned.

BACKGROUND OF THE INVENTION

1. Field of the Invention

The present invention relates to a tire air pressure warning apparatus for a vehicle and the like such as an automobile, airplane, and etc., and more particularly it relates to tire air pressure warning apparatus which can detect promptly any abnormality and give a warning by detecting the air pressure in a vehicle tire when the air pressure deviates from a predetermined pressure and an abnormal condition occurs, and thereby is feasible not only to prevent the fire from being damaged but also to keep the passengers safe.

2. Description of the Prior Art

When the air pressure within a tire of an automobile, airplane, and etc. is increased abnormally or reduced abruptly even without a puncture, naturally, damage of the tire can occur and also there is the possibility that the occupants can be endangered, so that it is a common knowledge that an appropriate inner air pressure of the tires must be maintained depending on the speed and the condition of road surface.

In view of the above, various tire air pressure warning devices for automatically detecting the inner air pressure of tires have been proposed heretofore, and typical devices utilize, a (1) current collector method wherein an air pressure detecting switch provided in a rotating tire portion and indicator provided in a stationary portion are connected with each other through a current collector ring mounted on the axle and a collector brush attached to the stationary portion; a (2) wireless method wherein a wireless frequency transmitter and transmitting antenna are provided on the tire rim and a signal is received by a receiving antenna and a receiver provided in a stationary portion; (3) and a resonance circuit method wherein an air pressure detecting switch, an antenna, and a tank circuit including inductance L and capacitance C are provided in a rotating tire portion, and a transmitter and a receiver are provided in a stationary portion, and which method makes use of the intermittent retransmission of the tank circuit responding to the variations in tire air pressure by transmitting intermittently the same frequency as the resonance frequency of the tank circuit. However, since the current collector ring method requires a mechanism sliding contact, degradation of performance tends to be caused by imperfect contact due to wearing of the members, dust and oil. The wireless method is complicated in structure since an electric source such as a generator, a battery or the like must be attached in the rotating tire portion as the power source for the transmitter, and there is also the problem that maintenance is troublesome, and particularly in case the of a generator, there is a fatal defect that the method loses its detecting function when the vehicle is stopped.

Furthermore, the third resonance circuit method employs a complicated mechanism, deviations in resonance tend to occur, detecting accuracy is a problem, and therefore is of less general usability.

As mentioned above, various prior art warning devices all have a problem in the permanent stability of the detecting function, and there are problems such as an increase in cost due to the complexity of the device, the intricacy of maintenance and the like. In fact they are not used in general.

SUMMARY OF THE INVENTION

A first object of the present invention is to provide a tire pressure warning apparatus which eliminates all at once these various defects of prior devices with a simple mechanism and means, and which thereby also maintains the travelling stability of a vehicle, etc., and improves safety.

A further object of the present invention is to provide a tire pressure warning apparatus which is able to reduce the number of the various members disposed in the rotating tire portion while making the device rigid so that rotary movement and centrifugal force do not influence the apparatus, and thereby ensuring stable detecting performance for a long period time and decreasing the labor required for maintenance.

Another object of the present invention is to provide a tire pressure warning apparatus which has no wearing parts and thereby making the detecting and responding mechanism permanently stable using an electrical coupling method having no mechanical contact mechanism for the signal transmitting and receiving action between the transmitting end of a detecting unit in a rotating tire portion and a receiving end of the receiving unit on the body of the vehichle etc., the body, etc. being stationary with respect to the rotating tire portion and forming the so-called stationary portion.

The present invention provides a tire pressure warning apparatus which reduces the crosstalk between the transmitting end and the receiving end to as small amount as possible, increases the signal to noise ratio (S/N ratio) and facilitates the attachment of the transmitting head and the receiving head.

The present invention further provides a tire pressure warning apparatus which improves temperature resistance performance under high temperature conditions, and low temperature conditions without providing any electric source and response device in a rotating tire portion, and which also demonstrates a positive detecting function simply by a connection with the electrical power source of the vehicle etc., both when the vehicle is being driven and when it is stopped.

Further, the present invention principally provides a tire pressure warning apparatus which facilitates miniaturization of the air pressure detecting unit by adopting a semiconductor circuit method, and which is low in price and high in general usability.

The objects of the present invention mentioned above, are accomplished by provision of a tire pressure warning apparatus comprising; a pressure sensor which is secured to a rotating tire portion and which changes its output in response to the variation of tire air pressure; an annular conductive member secured coaxially to the rotating tire portion and varying in impedance value corresponding to the output variation of the pressure sensor; at least a pair of confronting heads supported in a stationary portion, such as a vehicle and the like, and disposed adjacent the annular conductive member while maintaining electrostatic or electromagnetic coupling therewith a response device increasing or decreasing its output signal level in response to the variation of impedance between the confronting heads; and an indicator generating a warning signal in response to the output signal of the response device.

Further, the objects of the present invention are accomplished by providing a tire air pressure warning apparatus having an impedance coupling (A) between at least a pair of confronting heads and which coupling varies electrostatically or electromagnetically in accordance with the tire pressure, with the annular conductive member serving as a trunking medium and simultaneously actuating the transceiver unit of a self oscillation type in response to these variations.

BRIEF DESCRIPTION OF THE ACCOMPANYING DRAWINGS

These and other objects and novel features of the present invention will be more apparent from the following detailed description referring to the accompanying drawings.

FIG. 1 is a flow chart showing the principle of the operation of the apparatus according to the present invention.

FIG. 2 is a cross section of the wheel of an automobile relating to a specific embodiment of a tire pressure warning apparatus equipped according to the principle of the present invention.

DETAILED DESCRIPTION OF PREFERRED EMBODIMENTS

Figure 3:
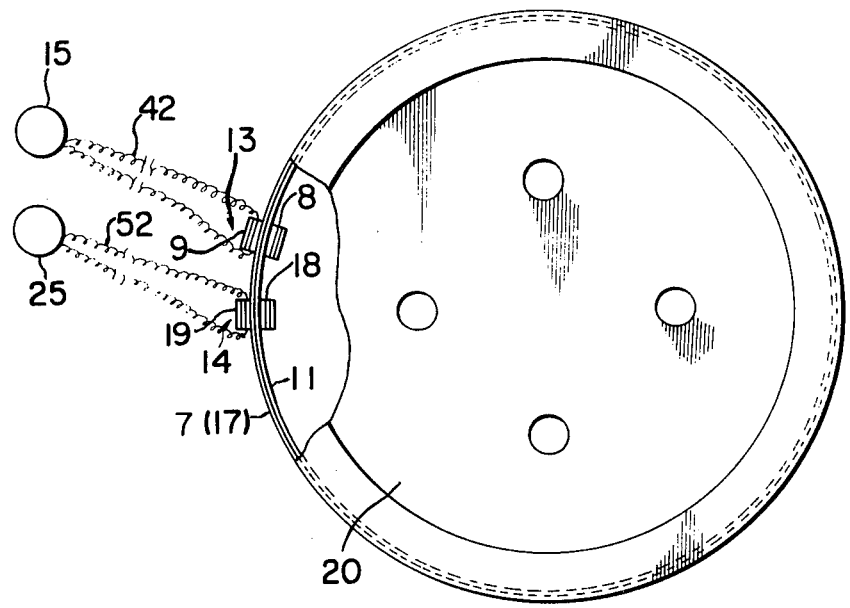
FIG. 3 is a partially broken side view taken along the line III—III viewed in the direction shown the by arrow in FIG. 2.

The drawings and embodiments described hereinafter, however, are only for the purposes of explanation and not intended to limit the scope of the invention. It will be readily understood by one skilled in the art that the present invention can be modified variously without departing from the gist of the invention.

The term "rotating tire portion" as used in the present specification indicates the rotating portion including the axle, the wheel and the tire assembly and the term "stationary portion" indicates generally the chassis and various members formed integrally therewith.

Initially, the fundamental principle of the device according to the present invention will be explained by reference to the flow chart shown FIG. 1.

Annular conductive member 1, including an electromagnetic coil or a ring body supported coaxially in the rotating tire portion while maintained electrically insulated therefrom, is formed so that it is variable in its proper impedance value electrically correlated to pressure sensor 2 which is capable of producing an output of, for example, "1" or "0" in response to the variation of the pressure P of the fluid confined.

An annular conductive member 1 and a pressure sensor 2 are fixed in each rotating tire portion of a vehicle such as an automobile and the like.

A pair of confronting heads 3 and 4 faced adjacent the annular conductive member 1 while maintaining an electrostatic or inductive coupling are fixed in a stationary portion, for example, in the chassis, and the impedance coupling A between both confronting heads 3 and 4 is varied remarkably according to the impedance variation of the annular conductive member 1.

By correlating the confronting heads 3 and 4 causing the variation in the impedance coupling A with the response device 5 fixed in a suitable position in the stationary portion to act as the warning part of the response device 5, the response device 5 acts to transmit or shut off its output signal in response to the output "1" or "0" respectively of the pressure sensor 2. The variation of the output of the response device signal is indicated by indicating device 6 as an optical signal which can be seen or a sound signal which can be heard.

The confronting heads 3 and 4, the response device 5 and the indicating device 6, are fixed in a stationary portion of vehicle body as stated above.

The response device 5 may be a tranceiver comprising a transmitting unit having the confronting head 3 as the transmitting end thereof and a receiving unit having the confronting head 4 as the receiving end thereof or may be an oscillation amplifier of the self-oscillation type wherein the space between both confronting heads 3 and 4 comprises a positive feedback circuit through the annular conductive member 1.

Specific embodiments of the apparatus according to the present invention for carrying out the detection of tire air pressure based on the fundamental principle described above, are illustrated in FIGS. 2 to 7.

Hereunder, the apparatus according to the present invention will be explained successively by reference to each example shown in the accompanying drawings.

In the apparatus shown in FIGS. 2 and 3 relating to a warning apparatus of a non-feedback electromagnetic induction method, the wheel 10 of an automobile is securely fitted on the end portion of the axle of the automobile through a disc portion 20, on the peripheral rim portion is mounted tire 30 containing tube 40, and within the tube sufficient compressed air is maintained for a proper pressure. In case of a tubeless tire, tube 40 is omitted.

In the inside rim portion of the wheel located on the center side of the chassis and coinciding with the peripheral portion of the disc 20, pocket having a large space is formed, and in this pocket electromagnetic coil 11 is disposed as the annular conductive member 1 constituting one of the principal parts of the present invention, and is securely engaged with the disc 20.

The electromagnetic coil 11 is in the form of an annular electromagnetic coil having the required number of turns by winding an insulated fine copper wire, and the electromagnetic coil 11 engages the inner wall surface of nonmagnetizable ring 7 secured to the disc 20 of the wheel coaxially with the tire 30 fixtures 43. Both ends of the coil are opened, and the coil is secured to the nonmagnetizable ring 7 with suitable means such as by bonding and the like.

The electromagnetic coil 11 is not limited to the example described above, but can be, for example, a so-called one turn coil formed by winding a steel band into an annular shape and which is opened at both ends the thereof.

The electromagnetic coil 11 is disposed in a fixed position coaxially with the axle, and when the disc 20 fitted on the axle is rotated, the electromagnetic coil 11 is also rotated smoothly in a plane perpendicular to the axle without any deviation.

The fixed position of the electromagnetic coil 11 is not limited to being on the wheel on the center side of the chassis, and the coil can be placed on the outside of the rim portion or on the inner surface of the rim, and also, when the disc 20 is a non-magnetizable member, the coil can be secured directly to the disc 20.

The non-magnetizable ring 7 described above may be of a material having sufficient rigidity against external forces accompanying rotation, regardless of whether it is a metallic or non-metallic material in addition to magnetizable materials such as iron, cobalt, nickel, ferrite or the like, and to reduce crosstalk between transmitting head 13 and receiving head 14 described later and simultaneously to stabilize the signal transmission level even if a small variation occurs in the relative position of the electromagnetic coil 11 and both heads 13 and 14 due to the deviation of the non-magnetizable ring 7 in the axial direction of the axle, and it is needless to say that a disposition possible to accomplish such objects is necessary.

2 is a pressure sensor, and in the example, comprises a detecting portion for detecting the air pressure within the tire by using a pressure valve switch and a switch mechanism in which the contacts are opened or closed in response to the variation in the pressure detected by the detecting portion 12. The detecting portion is capable of detecting the pressure within the tube 40 and projects into the air pressure chamber in the tube 40 through the rim to it is secured.

The switch mechanism 22 of the pressure valve switch 2 is connected via a lead wire on a terminal on one side thereof with one end of the electromagnetic coil 11 and a lead wire on another terminal on the other side thereof to the other end of the electromagnetic coil 11.

Both the magnetic transmitting head 13 and the magnetic receiving head 14 forming the confronting head 3 and the confronting head 3 and the confronting head 4, respectively are substantially equivalent in structure, so that only the magnetic transmitting head 13 will be explained. Transmitting coil 9 is secured to one leg base portion of a U-shaped core 8, and both leg portions thereof straddle the non-magnetizable ring 7 to which the electromagnetic coil 11 is fixed. The transmitting coil 9 is placed to be disposed to face adjacently the electromagnetic coil 11, and both head 13 and 14 are secured through head fixture 41 to the frame of the chassis as the stationary portion, i.e., stationary relative to the rotating tire portion. The magnetic transmitting head 13 connects the coil 9 to transmiter 15 which is capable of transmitting an electric wave of appropriate frequency, and the magnetic receiving head 14 connects the coil 19 to the input end of the receiver 25.

The receiver 25 is a well known receiver which amplifies successively the low level potential induced in the coil 19 of the magnetic receiving head 14 by voltage amplification and electric power amplification to energize an output relay thereby actuating an alarm circuit or an alarm lamp circuit.

Also as the power source for supplying power, a battery or an alternating current generator for the transmitter may be mounted in automobile and the receiver may use the battery as the power source, or the dynamo already found in the automobile may be used.

The structure of the apparatus according to the present invention thereof will be explained hereunder.

While the pressure within the air chamber in the tire 30 is maintained at a predetermined value, the contacts of the switch mechanism 22 of the pressure valve switch 2 are opened, so that the electromagnetic coil 11 is released or open-circuited. More specifically an electric wave issued from the transmitter 15 passes through lead wire 42 and the coil 9, and forms a magnetic field around transmitting magnetic core 8, so that an electromotive force is induced only in the electromagnetic coil 11 facing adjacently the transmitting head 13 in accordance with the variation of magnetic flux of the magnetic field, and no current flows in the electromagnetic coil 11.

Since no current flows in the electromagnetic coil 11, no voltage is induced in the magnetic receiving head 14, therefore the receiver 25 connected with the magnetic receiving head 14 through lead wire 52 is not actuated and thereby indicates a normal condition.

Now, regardless of whether the automobile is being driven or is stopped, when the pressure within the air chamber, in the tire 30, for example, drops or departs widely from the predetermined value, the pressure valve switch 2 detects the abnormal value and closes the contact of the switch 22, so that the electromagnetic coil 11 forms a closed circuit. As a result, a short circuit current flows in the coil 11 in response to the voltage induced therein. The variation of magnetic flux caused thereby is received by the receiving head 14 and the signal is transmitted to the receiver 25. The receiver 25 is energized and thereby an audible alarm circuit of an lamp alarm circuit is actuated, and the driver is informed of the abnormal drop of the tire air pressure. Additionally, a circuit structure is possible in which the contact of the pressure valve switch 2 is normally closed and the coil 11 is released or open-circuited when an abnormality occurs, and such a structure is also preferable.

In the description above, an example wherein the apparatus according to the present invention is used to detect an abnormal drop of tire air pressure, is shown, but it is also possible to use the apparatus for detecting an abnormal increase of tire air pressure only by modifying slightly the switch 22 of the pressure valve switch 2. It also is possible to detect both an abnormal increase and abnormal drop of tire pressure by using jointly pressure valve switches 2 acting in different pressure areas.

The pressure sensor 2 is not limited to an on-off switching mechanism as shown in this embodiment but may be any variable resistance element or the like, in which the electric resistance varies in response to a variation of tire air pressure by using a semi-conductor element and the like as essential components. In this case, not only is the transmission of an on-off signal possible, ut it is also possible to transmit in a similar manner the variation of tire air pressure by changing the degree of signal transmission, and, as a matter of course, this is also included within the present invention.

As described above, the apparatus according to this present invention employs a simple construction including the non-magnetizable ring 7 in the rotating tire portion side disposed coaxially therewith, the electromagnetic coil 11 mounted on the ring 7, the pressure sensor 2, and the electric lead wire connecting both the electromagnetic coil 11 and the pressure sensor 2. These members have the advantages that they do not change in performance due to the influence of centrifugal force during rotation of the tire, and require little labor in maintenance.

Since the transmitter and receiver requiring power sources are fixed on the chassis side forming the stationary portion as opposed to the rotating tire portion, it is possible to shield perfectly the transmitter receiver from the influence of oscillation and centrifugal force, and there is no wearing portion therein. Thereby, not only is the function of the transmitter and receiver stabilized permanently, but also the connection with power the source is quite easy.

Further, by using the non-magnetizable ring 7, the crosstalk between the transmitting and receiving cores 8 and 18 may be reduced, and naturally it is possible to obtain a high signal to noise ratio (S/N ratio) even when they are attached very close to each other. In addition there is an advantage that the transmitting and receiving heads 13 and 14 may be attached easily and also are compact.

Since the transmitting head 13 and the receiver head 14, fixed both to the stationary portion, and the electromagnetic coil 11, fixed to the rotating portion, are disposed so that they do not contact directly each other, there is no sliding portion contact therebetween, so that there is an advantage that no change occurs in their property on continuous use for a long time. Furthermore, since the transmitting end and the receiving end are positioned in the inside of the rim of the wheel, they are protected from rain, and flying water, pebbles and sand, and thereby damage and rusting are prevented.

Figure 4:
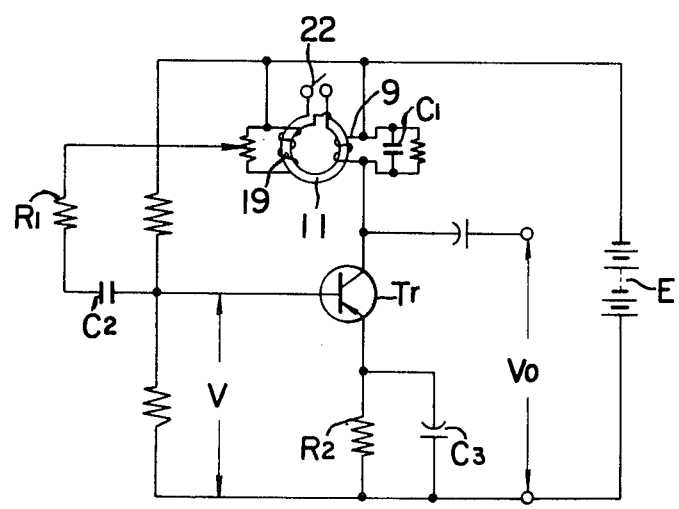
FIG. 4 is an example of an electric circuit diagram relating to the apparatus according to the present invention as shown in FIG. 2.

And then, another embodiment of the apparatus according to the present invention will be explained referring to FIGS. 2 to 4.

This apparatus includes a positive feedback circuit out of the electromagnetic induction method, and the electromagnetic coil 11, pressure sensor 2 and confronting heads 3 and 4 forming the elements thereof have the same structure as the case of the warning apparatus of the non-feedback type electromagnetic induction method, and the mode of their arrangement is similar, but the supporting ring 17 for fixing the electromagnetic coil 11 can accomplish its purpose when it is formed in an annular body having sufficient rigidity regardless of whether it is a non-magnetizable member or a magnetizable member.

And, as to the magnetic heads 13 and 14 as confronting heads 3 and 4, they differ from the example discribed above in that magnetic head 13 is utilized as output oscillation end and the other magnetic head 14 is utilized as feedback oscillation means. It is as stated above that both magnetic heads 13 and 14 are in an impedance coupling A relationship through the electromagnetic coil 11, and each of the oscillation coils 9 and 19 of the elctromagnetic heads 13 and 14 is in electrical contact with the oscillation amplifier shown in FIG. 4 as an example of the formation of the coupling portion of the self-oscillation circuit.

The principal parts of the electric circuit discribed above will be explained referring to FIG. 4, in which oscillation coil 9 forms a tank circuit together with condenser $C_1$ and is interposed between a collector of a PNP type power transistor Tr and the negative pole of a power source E. On the other hand, oscillation coil 19 connected with the oscillation coil 9 through electromagnetic coil 11 to form impedance coupling A is adapted to feedback the partial potential of the signal created at both ends thereof to the transistor Tr as positive a feedback signal through resistance $R_1$ and condenser $C_2$ connected to the base of the transistor Tr. Also, in the drawing, the RC circuit including a resistance $R_2$ and a condenser $C_3$ is a by-pass circuit interposed between the positive pole of the power source and the emitter of the transistor Tr.

The oscillation amplifier of the present invention is not limited to the example described above, and it is needless to say that the oscillation amplifier may be replaced with other oscillation amplifiers capable of carrying out self-oscillation based on a Hartley circuit and other well known oscillation circuits.

The construction of the apparatus according to the present invention is above described, and the action thereof will be explained additionally hereunder.

When the pressure within the air chamber in the tire 11 is maintained at a predetermined value, the switch 22 of the pressure valve switch 2 opens the contact thereof, so that both ends of the electromagnetic coil (11) are released or open circuited. Consequently the coupling factor of the mutual induction between the output oscillation head 9 and the feedback oscillation head 19 is quite small. Accordingly the voltage Vo between the collector and the emitter of the transistor Tr is of low value. Thereupon, an indicating device (not shown) such as an alarm gauge and the like connected to the ouput of the transistor is not actuated and indicates normal conditions.

Now, when the pressure within the air chamber in the tire 30, for example, drops departing widely from a predetermined value, regardless of whether the automobile is being driven or is stopped, the pressure valve switch 2 detects the abnormal value and closes the contact of switch 22, so that electromagnetic coil 11 forms a closed circuit. As the result; a mutual induction between the heads 13 and 14 increases up to the limit of an initially predetermined value, and thereby the oscillation amplifier circuit begins self-oscillation at a frequency by means of the positive feedback action of the feedback oscillation coil 9, so that the output voltage is increased. Thereby the indicating device connected to the output of the amplifier circuit is energized. The alarm audible circuit or lamp alarm circuit is actuated, and the driver is informed of the abnormal drop of the tire air pressure.

Figure 5:
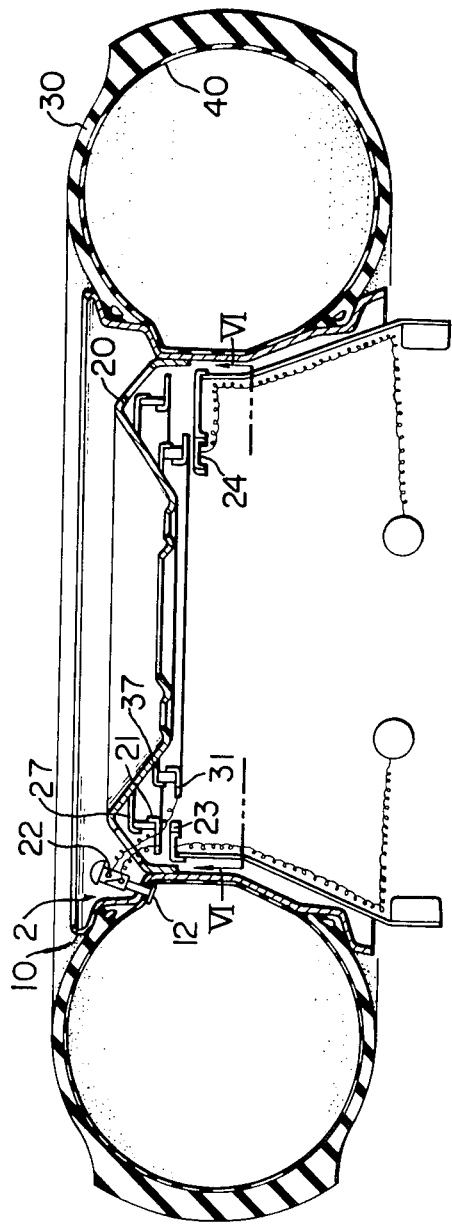
FIGS. 5, 6 and 7 show the mode of another embodiment according to the present invention, with FIG. 5 showing a cross section of the wheel, FIG. 6 showing a partially broken side view taken along the line VI—VI viewing in the direction shown by the arrow in FIG. 5, and with FIG. 7 showing an electric circuit diagram.
Figure 6:
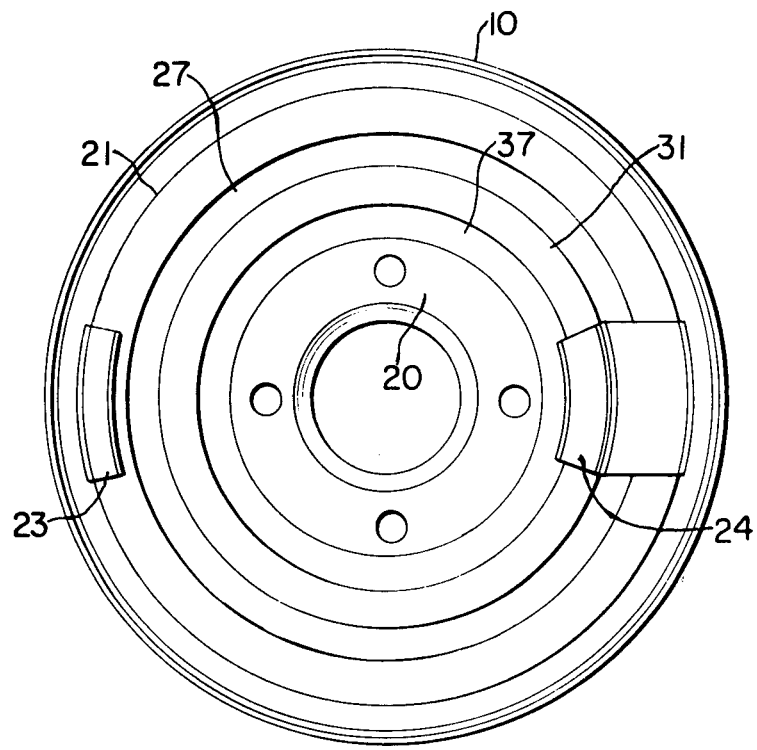

Then further, another embodiment of the apparatus according to the present invention will be explained referring to FIGS. 5 to 7. This embodiment shows a warning apparatus utilizing the electrostatic capacity coupling method, in which the annular conductive member 1 as the medium for the trunking signal differs from the one unit structure as shown in each of the examples described above, in that conductive rings 21 and 31 of two units different in diameter, form a pair and are disposed coaxially with the rotating tire portion and also with each other. The confronting heads 3 and 4 are fixed to the frame of the chassis and the conductor heads 23 and 24 formed respectively in a partial annular shape, disposed to face the planes thereof adjacent the planes of the conductive rings 21 and 31.

While the conductive rings 21 and 31 are fixed on the disc 20 through fixtures 27 and 37 of an insulating material, both of the rings 21 and 31 are coupled electrically together through the switch mechanism 22 of the pressure sensor 2. On the other hand, the conductor heads 23 and 24 are connected to the capacitor coupling portion of the self-oscillation circuit in an oscillation amplifier including positive feedback as shown in FIG. 7.

Figure 7:
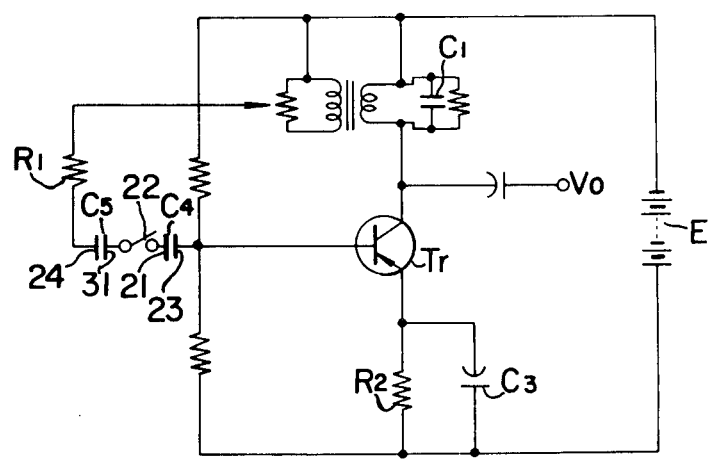

In the warning apparatus, the spaces between the conductive ring 21 and the conductor head 23, and the conductive ring 31 and the conductor head 24 act as condensers $C_4$ and $C_5$, so that, as for an electric circuit, they are used as the coupling condenser of the positive feedback circuit by setting it at a proper electrostatic capacity as shown in FIG. 7. As a result a structure with the pressure sensor 2 interposed between both condensers $C_4$ and $C_5$ may be obtained.

Further, as to the structure of the positive feedback circuit, it is a variation of the electromagnetic method already, described, and differs only in the point that the coil of the electromagnetic method is replaced with a fixed transformer, and the coupling condenser $C_3$ is replaced with the condensers $C_4$ and $C_5$ facing each other as described above.

The action of the warning apparatus constructed as mentioned above will be explained hereinafter.

When the pressure within the air chamber in the tire maintains a predetermined value, the contact of the switch 22 of the pressure sensor 2 is open, so that the conductive rings 21 and 31 are separated electrically, and there is no conduction between the condensers $C_4$ and $C_5$, and the current between the collector and emitter of the transistor $Tr$ is zero. Thereupon, the indicating device 6 (not shown) such as an alarm and the like connected to the output end of the transistor is not actuated and indicates normal conditions.

However, when the pressure within the air chamber in the tire, for example, drops and departs widely from a predetermined value, the pressure sensor 2 detects the abnormal value, and the contact of the switch 22 is closed, so that conduction between the condensers $C_4$ and $C_5$ occurs. As the result thereof, the oscillation amplifier becomes self-oscillating at a frequency, so that the output voltage $Vo$ increases, and thereby the indicating device 6 connected to the output end thereof is energized, an audible alarm circuit or a lamp alarm circuit is actuated, and the driver is informed of the abnormal drop of the tire air pressure.

As for both the warning apparatus according to the electromagnetic induction coupling method or electrostatic capacity coupling method, a circuit may be obviously modified so that the pressure valve switch 2 is normally closed, and the conductive ring or rings are released or open-circuited when a abnormality occurs. Also in embodiments described above, the warning aparatus is shown as an example wherein detection of an abnormal drop of tire air pressure is used, but it may be used for detecting an abnormal increase of tire air pressure by modifying the switch 22 of the pressure valve switch 2 slightly. Also, both an abnormal increase and drop of tire air pressure may be detected by using jointly the pressure valve switches 2 acting in different pressure areas.

As to the warning apparatus shown in the last embodiment, besides the example shown above wherein the conductive rings 21 and 31 different in diameter are disposed coaxially with respect to the annular conductive member, it is also possible to form a partial annular member including at least a pair of ring members, to face at least a pair of confronting heads to this partial annular member to maintain electrostatic capacity and connect these ring members to each other through a pressure sensor. Further it is possible to provide two sets of detecting units using a pressure sensor and two confronting heads as elements, and to correlate the two sets with the response device, for example, one for detecting an abnormally high pressure and the other for detecting an abnormally low pressure. As a matter of course these modification are included within the scope of the present invention.

Thus, in both of these types of warning apparatus, since response device 5 actuated by an abnormality of tire air pressure is formed as the self-oscillation amplifier, when a detecting circuit using a semi-conductor element as an essential material is employed, as compared with a response device formed by combining a transmitter and a receiver, the circuit may be formed with a transistor, resistance, condenser and the like, so that a very inexpensive and compact apparatus may be provided, and further an advantage is the general usability is broad.

The present invention has been described in detail and with respect to preferred embodiment thereof. According to the present invention, the abnormality of tire air pressure may be detected without attaching a power source and a response device to the rotating tire portion, and the present invention is capable of providing a tire pressure warning apparatus which is low in price, and high in heat resistance and reliability.

While the invention has been described in detail and with reference to specific embodiments thereof, it will be apparent to one skilled in the art that various changes and modifications can be made therein without departing from the spirit and scope thereof.

What is claimed is:

1. A tire pressure warning apparatus for a vehicle having a pneumatic tire mounted on a rotatable wheel fixed to an axle of the vehicle, and comprising:
   pressure sensor means supported in said tire for sensing the tire air pressure;
   switch means coupled to said pressure sensor means and switchable between an open-circuit state and a closed circuit state in response to the sensing of an abnormal value of tire air pressure;
   an annular conductive member secured to said wheel and electrically connected in series with said switch means;
   a pair of spaced confronting heads fixed to a stationary portion of said vehicle such that said heads are stationary when said tire and wheel are rotating, said heads being disposed adjacent to said annular conductive member and adapted to form an electrical non-resonant impedance coupling (A) therewith when said switch means is in said closed circuit state;
   response circuit means mounted on said stationary portion and electrically coupled to said confronting heads for producing an output signal only when said switch means is switched from one of its states to the other in response to said abnormal value of tire pressure to form said impedance coupling; and
   indicator means coupled to said response circuit means for producing a warning signal in response to said output signal;
   wherein said annular conductive member is an elctromagnetic coil, and said confronting heads are electrically unconnected electromagnetic heads which are spaced along said coil and which are mutually inductively coupled via said impedance coupling when said switch means is in closed circuit state; and wherein
   said response circuit means comprises continuously operating transmitter means coupled to only one of said heads for continuously applying an A.C. signal thereto to induce in said coil a voltage which causes a current to flow in said coil only when said switch means is in said closed circuit state, and receiver means coupled to only the other of said heads for producing said output signal, the continuous operation of said transmitter means being independent of the state of said switch means.

2. Apparatus as claimed in claim 1 further comprising a nonmagnetizable ring fixed to said wheel coaxially with said annular conductive member and contacting said member along the periphery thereof.

* * * * *